United States Patent

Itou et al.

[11] Patent Number: 5,986,799
[45] Date of Patent: Nov. 16, 1999

[54] OPTICAL AMPLIFIER HAVING AN ATTENUATOR FOR ATTENUATING INPUT POWER TO ELIMINATE A SURGE IN AN AMPLIFIED OPTICAL SIGNAL

[75] Inventors: Hiroyuki Itou; Tsukasa Takahashi, both of Sapporo, Japan

[73] Assignee: Fujitsu Limited, Kawasaki, Japan

[21] Appl. No.: 09/038,143

[22] Filed: Mar. 11, 1998

[30] Foreign Application Priority Data

Oct. 7, 1997 [JP] Japan .................................. 9-274795

[51] Int. Cl.⁶ .............................. H01S 3/094; G02B 6/28; G02F 1/39
[52] U.S. Cl. ........................ 359/337; 359/127; 359/154; 359/194; 359/341
[58] Field of Search ..................... 359/127, 154, 359/194, 337, 341

[56] References Cited

U.S. PATENT DOCUMENTS

| | | | |
|---|---|---|---|
| 5,267,071 | 11/1993 | Little et al. | 359/154 |
| 5,457,811 | 10/1995 | Lemsa | 359/194 |
| 5,570,227 | 10/1996 | Nabeyama et al. | 359/341 |
| 5,633,749 | 5/1997 | Shibuya | 359/341 |
| 5,664,131 | 9/1997 | Sugiya | 359/341 |
| 5,701,195 | 12/1997 | Chikama | 359/341 |
| 5,812,710 | 9/1998 | Sugaya | 359/127 |
| 5,818,629 | 10/1998 | Kinoshita | 359/341 |

FOREIGN PATENT DOCUMENTS

| | | |
|---|---|---|
| 6-51255 | 2/1994 | Japan . |
| 9-61770 | 3/1997 | Japan . |
| 9-236784 | 9/1997 | Japan . |

*Primary Examiner*—Nelson Moskowitz
*Attorney, Agent, or Firm*—Staas & Halsey LLP

[57] ABSTRACT

An optical amplifier prevents generation of an optical surge when an input signal to the optical amplifier is interrupted. A synthesized signal of an input signal light and a pumping light is input to an optical amplifying medium. An input signal light interruption detecting circuit detects an interruption of the input signal light. A variable attenuator element is provided on a signal light input side of the optical amplifying medium so as to attenuate the input signal light. The variable attenuator element is controlled based on an output of the input signal light interruption detecting circuit so that a degree of attenuation of the variable attenuator element is increased when the input signal light is interrupted and the degree of attenuation is gradually decreased when the input signal light returns.

21 Claims, 14 Drawing Sheets

OPTICAL AMPLIFIER HAVING AN ATTENUATOR FOR ATTENUATING INPUT POWER TO ELIMINATE A SURGE IN AN AMPLIFIED OPTICAL SIGNAL

BACKGROUND OF THE INVENTION

1. Field of the Invention

The present invention relates to an optical amplifier used for an optical transmission system or an application for an optical measuring instrument. More particularly, the present invention relates to an optical amplifier which can prevent an optical surge from occurring when an output signal is interrupted for a moment.

In an optical transmission system, an optical amplifier is used for increasing a transmissible distance or reducing a system cost of a conventional 3R regeneration relay. Additionally, a demand for an optical amplifier which can generate high-power light to be used in a measuring application for design or evaluation of an optical transmission has been increased.

2. Description of the Related Art

In an optical transmission system or measuring application, many systems are used in which an optical amplifier using an erbium doped fiber (EDF) directly amplifies an optical signal. In such an EDF amplifier, a high-power light (optical surge) which greatly exceeds a preset optical output level is transitively generated during an instantaneous interruption of an input optical signal.

The optical surge can be defined as follows. It is assumed that an optical power of an output signal shown in a lower half of FIG. 1 is obtained as a result of amplification of an input signal having an optical power shown in an upper half of FIG. 1. The optical surge is defined by a ratio of a peak level to a normal output level when a high-power light having a level exceeding a normal level is generated.

$$\text{optical surge level } (dB) = 10\ \log(p2/p1)$$

where P2 is a peak level (W) of the output optical surge, and P1 is a normal optical output level (W).

It should be noted that $\Delta tr$ shown in FIG. 1 is a period of time on an order of micro seconds ($\mu s$).

FIG. 2 is a conceptual illustration of generation of an optical surge.

FIG. 2-(a) indicates a state where both a pumping light and a signal light are incident on an optical amplifier medium (for example, EDF).

$$\Delta E = E2 - E1 = h\nu$$

where $\Delta E$ is an energy gap, E2 is an excitation level, E1 is a ground level or a low energy level, h is Plank's constant, and v is a frequency of an output light. In this state, a ratio of density of optically amplifying media (Er ions) in each of the excited level (E2) and the ground level (E2) is constant, and the excited level and the ground level are balanced (A density N2 in the excited level and a density N1 in the ground level are equal to each other.)

FIG. 2-(b) indicates a state where the signal light input to the optically amplifying media is stopped or interrupted but the pumping light is continuously incident on the optically amplifying media. In this state, the ratio of density of the optically amplifying media in the excited state is increased (N2>>N1), and an excitation rate (population inversion ratio) is at a high level. Accordingly, a spontaneous emission light which satisfies the relationship $\Delta E = E2 - E1 = h\nu$ is emitted.

FIG. 2-(c) indicates a state where the input signal light is returned from the interrupted state to the normal state. In this state, the optical amplifier media at the excited level emits energy to the input signal light more than that of the state (a) so that the optical amplifier medium rapidly returns to the state (a) where the ratio of density of the optical amplifier medium at either the excited level or the ground level is balanced. As a result, the signal output after the return has an optical surge having a level exceeding the normal output level.

FIG. 3 shows a relationship between an amount of the optical surge and the instantaneous interruption time in a case where the pumping light is stopped when the interruption of the pumping light occurs. As shown in FIG. 3, the amount of the optical surge decreases when the instantaneous interruption time exceeds about 1 ms.

A relationship between the optical surge and the instantaneous interruption time when the pumping light is not stopped is shown in FIG. 4. The graph shown in FIG. 4 includes an optical surge ungenerated time area A and an optical surge generated time area B. In the optical surge ungenerated time area A, an optical surge is not generated since the interruption time is not so short such that a rare earth doped fiber used as an optical amplifying medium cannot respond.

As a means for preventing an occurrence of such an optical surge, two measures have been taken conventionally. One of them is shown in FIG. 5. In the conventional system shown in FIG. 5, an amount of optical surge is suppressed by stopping the pumping light by detecting an interruption of the input signal light. The suppression of the amount of the optical surge can be achieved by speeding up the stopping of the pumping light. That is, the optical surge in the output signal light can be suppressed by decreasing accumulation of energy at a minimum by speeding up the stopping of the pumping light.

In the system shown in FIG. 5, the amount of optical surge is suppressed by stopping the pumping light by detecting the input signal light. In this system, an erbium dopes optical fiber EDF is used as an optical amplifying medium. The input signal light is input to an input terminal 1, and is synthesized with the pumping light by a wave length division multiplexer WDM. The synthesized light is incident on the erbium doped optical fiber FDF, and an amplified output signal light is obtained at an output terminal 2.

Additionally, in the system shown in FIG. 5, the input signal light input from the terminal 1 is monitored by a path of a beam splitter BS and a photo diode PD so as to stop the pumping light by decreasing a reference voltage (ALC–ref) of an ALC (automatic level control) circuit when the input signal light is decreased to a threshold value (Vref).

FIG. 6 is a circuit diagram of an example of the ALC circuit. A relationship between the optical surge and the instantaneous interruption time of the example shown in FIG. 6 corresponds to that shown in FIG. 3. Different from the graph shown in FIG. 4, the graph shown in FIG. 3 includes an optical surge ungenerated time area C. This area is generated due to stopping of the pumping light. That is, as shown in FIG. 2-(b), even if a density of carriers at an excitation level is high at an initial state, the density at the excited level decreases as radiation light is gradually emitted while no carrier is raised to the excited level due to the stopping of the pumping light. As a result, the density of carriers at the excited level is decreased and, thereby, the optical surge is not generated in the area C when the input light returns. The start time of this time area is substantially equal to an average life time of the carrier at the excited level in the rare earth doped optical fiber, which is an optical amplifying medium, when the time is measured from the time when the pumping light is stopped.

The amount of optical surge in the circuit shown in FIG. 5 is dependent on 1) an output pumping light entering after the interruption of the input signal light, 2) an increasing speed of the input signal light which returns after the interruption and 3) the interruption time of the input signal light. Among these factors, the factor 1) is able to be handled in the optical amplifier by increasing the speed of stopping the pumping light, whereas the factors 2) and 3) cannot be handled by the optical amplifier alone since the factors 2) and 3) are external factors for the optical amplifier. Accordingly, an optical surge may always be generated depending on the condition of the increasing speed at the time for returning the input signal light after an interruption and an interruption time of the input signal light.

FIG. 7 shows an example of a system which improves on the system shown in FIG. 5. In the system shown in FIG. 7, an optical transmission delay fiber TDF for delaying transmission is connected subsequent to the optical amplifying medium EDF, and an optical surge which has already been generated is suppressed by using a variable attenuator element ATT. A part of the amplified signal is split by a beam splitter BS2, and is monitored by a photo diode PD2 so that, when an optical surge is generated, the optical surge is prevented from being output from the output terminal 2 by increasing a degree of attenuation while the optical surge is delayed by the transmission delay optical fiber TDF.

In this technique, 1) the transmission delay optical fiber is needed, and 2) the variable attenuator element must be connected subsequent to the optical amplifying medium EDF. Since the variable attenuator element at the present time generates a transmission loss (1 to 2 dB), the loss must be compensated so as to obtain the same output.

Accordingly, the above-mentioned improved technique has drawbacks in that:

1) the need for the transmission delay optical fiber is a problem for downsizing the optical amplifier; and
2) the connection of the loss generating factor is a problem for obtaining a high output.

SUMMARY OF THE INVENTION

It is a general object of the present invention to provide an improved and useful optical amplifier in which the above-mentioned problems are eliminated.

A more specific object of the present invention is to provide an optical amplifier which prevents generation of an optical surge when an input signal to the optical amplifier is interrupted.

Another object of the present invention is to provide an optical amplifier which prevents generation of an optical surge and, at the same time, an increase in size and a deterioration of an assembly operation due to an increase in the number of parts are prevented.

A further object of the present invention is to provide an optical amplifier which prevents generation of an optical surge while a decrease in the level of an output signal is prevented, which decrease is caused by a variable attenuator, which is a loss generating factor with respect to an optical signal, being connected subsequent to the optical amplifying medium.

In order to achieve the above-mentioned objects, there is provided according to a first aspect of the present invention an optical amplifier having an optical amplifying medium to which a synthesized signal of an input signal light and a pumping light is input, the optical amplifier comprising:

an input signal light interruption detecting circuit detecting an interruption of the input signal light; and a variable attenuator element attenuating the input signal light, the variable attenuator element provided on a signal light input side of the optical amplifying medium, wherein the variable attenuator element is controlled based on an output of the input signal light interruption detecting circuit so that a degree of attenuation of the variable attenuator element is increased when the input signal light is interrupted and the degree of attenuation is gradually decreased when the input signal light returns.

According to the first aspect of the present invention, an optical surge can be prevented from being generated when an instantaneous interruption occurs in the input signal light irrespective of whether the optical amplifier has a means for stopping a pumping light.

Additionally, there is provided according to a second aspect of the present invention an optical amplifier having an optical amplifying medium to which a synthesized signal of an input signal light and a pumping light is input, the optical amplifier comprising:

an input signal light interruption detecting circuit detecting an interruption of the input signal light;

a timer for measuring a time after the input signal light is interrupted upon receipt of an output of the input signal light interruption detecting circuit; and a variable attenuator element attenuating the input signal light, the variable attenuator element provided on a signal light input side of the optical amplifying medium, wherein the variable attenuator element is controlled based on the output of the input signal light interruption detecting circuit so that a degree of attenuation of the variable attenuator element is increased when a predetermined time is elapsed after the input signal light is interrupted and the degree of attenuation is gradually decreased when the input signal light returns.

According to the second aspect of the present invention, an optical surge can be prevented from being generated irrespective of whether the optical amplifier has a means for stopping a pumping light. Additionally, the degree of attenuation of the variable attenuator element can be maintained at a minimum value during the period the optical surge is not generated. Thus, a rapid increase of the signal light can be achieved when the input signal light returns during the period the optical surge is not generated since the degree of attenuation of the variable attenuator element is minimum.

Additionally, there is provided according a third aspect of the present invention an optical amplifier having an optical amplifying medium to which a synthesized signal of an input signal light and a pumping light is input, the optical amplifier also having a means for stopping the pumping light, the optical amplifier comprising:

an input signal light interruption detecting circuit detecting an interruption of the input signal light;

a timer for measuring a time after the input signal light is interrupted upon receipt of an output of the input signal light interruption detecting circuit; and a variable attenuator element attenuating the input signal light, the variable attenuator element provided on a signal light input side of the optical amplifying medium, wherein the variable attenuator element is controlled based on an output of the timer so that a degree of attenuation of the variable attenuator element is increased when the input signal light is interrupted and the degree of attenuation is decreased at a time when an optical surge is no longer generated after a period during which an optical surge is generated is passed.

According to the third aspect of the present invention, an optical surge can be prevented from being generated when an instantaneous interruption occurs in the input signal light in a case in which the optical amplifier has a means for stopping the pumping light.

Additionally, there is provided according to a fourth aspect of the present invention an optical amplifier having an optical amplifying medium to which a synthesized signal of an input signal light and a pumping light is input, the optical amplifier also having a means for stopping the pumping light, the optical amplifier comprising:

an input signal light interruption detecting circuit detecting an interruption of the input signal light;

a timer for measuring a time after the input signal light is interrupted upon receipt of an output of the input signal light interruption detecting circuit; and a variable attenuator element attenuating the input signal light, the variable attenuator element provided on a signal light input side of the optical amplifying medium, wherein the variable attenuator element is controlled based on an output of the timer so that a degree of attenuation of the variable attenuator element is increased when a predetermined time is elapsed after the input signal light is interrupted and the degree of attenuation is decreased at a time when the optical surge is no longer generated.

According to the fourth aspect of the present invention, an optical surge can be prevented from being generated in a case in which the optical amplifier has a means for stopping the pumping light. Additionally, the degree of attenuation of the variable attenuator element can be maintained at a minimum value during the period the optical surge is not generated. Thus, a rapid increase of the signal light can be achieved when the input signal light returns during the period the optical surge is not generated since the degree of attenuation of the variable attenuator element is minimum.

In the third and fourth aspects of the present invention, the means for stopping the pumping light may stop the pumping light for a period during which the input signal light is interrupted.

Accordingly, in a case in which the optical amplifier has a means for stopping the pumping light, generation of an optical surge is prevented when an instantaneous interruption of the input signal light occurs.

Additionally, in the third and fourth aspects of the present invention, the means for stopping the pumping light may stop the pumping light for a predetermined period from a time when the period of an optical surge is not generated has elapsed after an interruption of the input signal light until a time when the input signal light returns.

Accordingly, stoppage of the pumping light is not performed during the period the optical surge is not generated. Thus, when the input signal light returns during the period the optical surge is not generated, a time needed for regenerating the pumping light can be eliminated and a rapid increase in the signal light can be achieved.

Additionally, in the third and fourth aspects of the present invention, the time when an optical surge is no longer generated may be determined based on a time passage after the input signal light is interrupted.

Accordingly, the determination of the time when an optical surge is no longer generated can be made by the timer.

Additionally, in the third and fourth aspects of the present invention, the time when an optical surge is no longer generated may be determined based on a level of spontaneous emission in the optical amplifying medium after the pumping light is stopped.

Accordingly, the determination of the time when an optical surge is no longer generated can be made based on an actual state of the optical amplifier without using a timer or a prediction of such time.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of preferred embodiments of the present invention.

Figure 8:
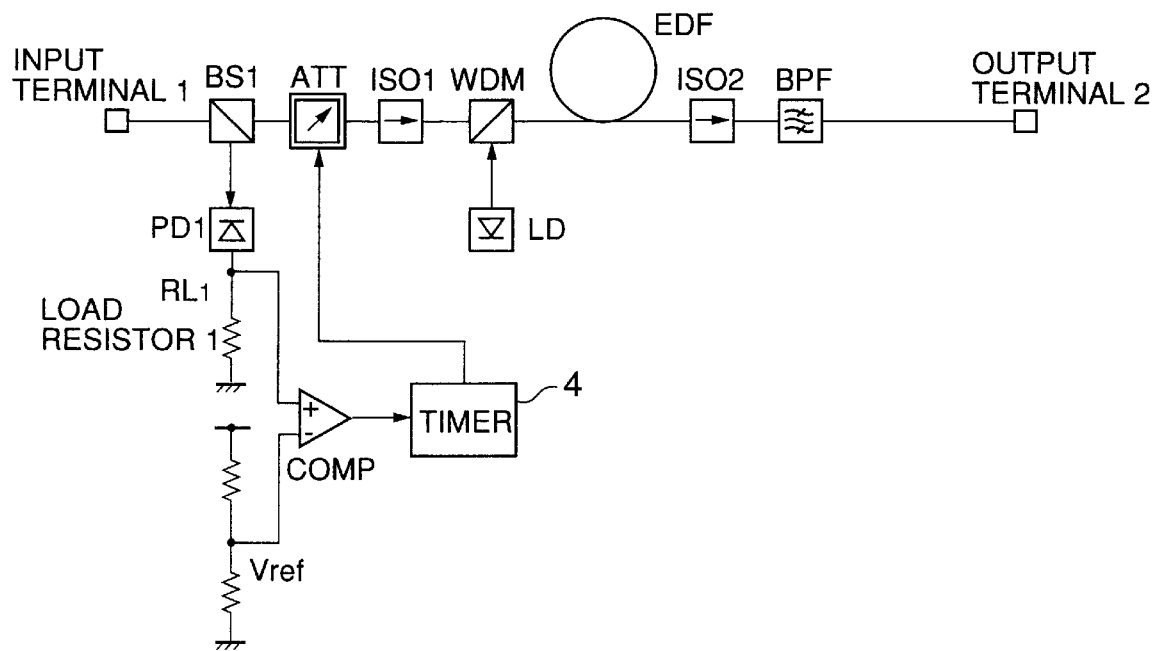
FIG. 8 is a system diagram of an optical amplifier according to a first embodiment of the present invention.

FIG. 8 is a system diagram of an optical amplifier according to a first embodiment of the present invention. In the system diagram shown in FIG. 8, although a pumping light stopping means is not shown, the optical amplifier may include the pumping light stopping means.

In the figure, an input signal light Pi is input to an input terminal 1, and is amplified by a beam splitter BS1, an attenuator ATT, an optical isolator ISO1, a wave length division multiplexer WDM, an optical amplifying medium EDF, an optical isolator ISO2 and an optical band pass filter BPF so that an amplified output light signal Po is output from an output terminal 2. A part of the input signal light Pi is continuously branched by the beam splitter BS1 and the split light is detected by a photo diode PD1. An output of the photo diode PD1 is compared with a reference voltage Vref by a comparator COMP so as to determine a presence of the detected light. When the input signal light Pi is present, a plus signal is output from the comparator COMP. When the input signal Pi is not present, a minus signal is output from the comparator COMP. A timer 4 controls the degree of attenuation of the variable attenuator ATT when an interruption of the input signal light Pi is detected, that is, when the output of the comparator COMP is a minus signal. A control may be performed without a time delay when an interruption of the input signal light is detected, or may be performed when a predetermined period has elapsed after the detection of the interruption. Accordingly, an operation of the timer 4 is not always required when the control is performed without a time delay.

Figure 9:
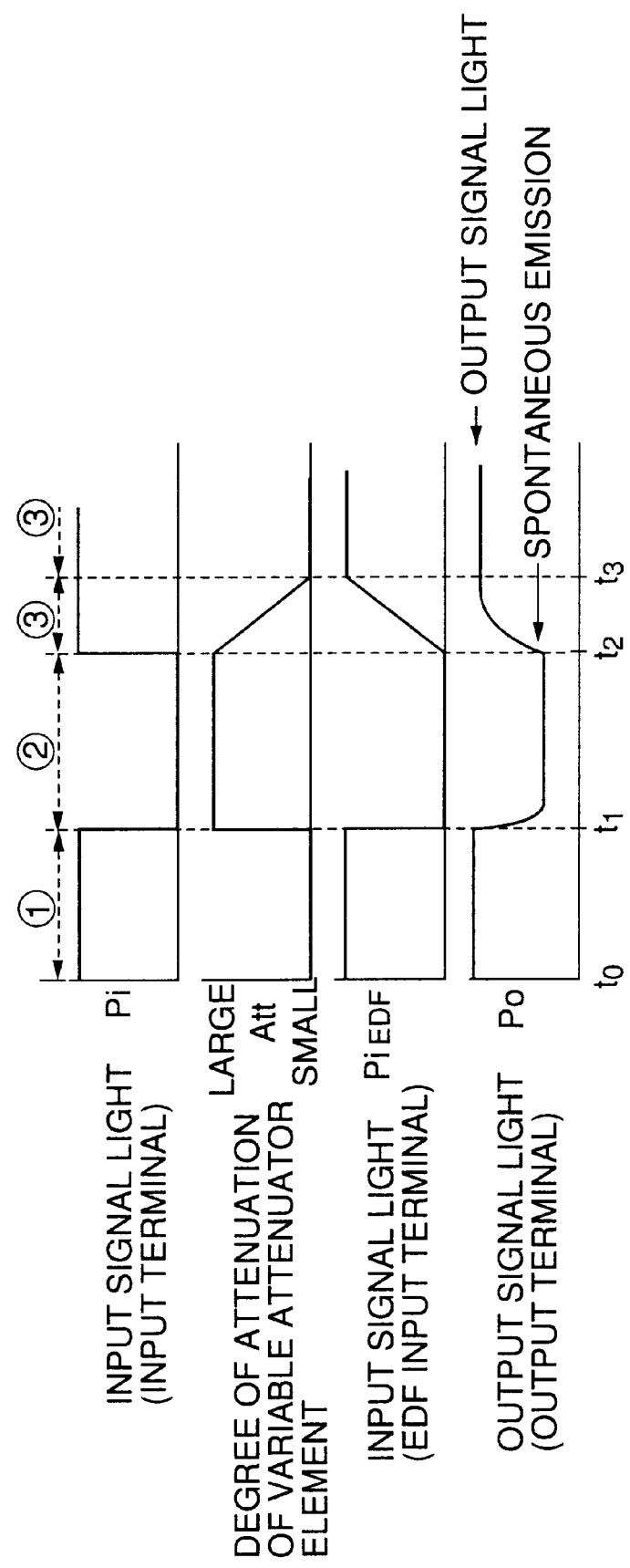
FIG. 9 is a time chart for explaining an operation of the optical amplifier according to the first embodiment of the present invention.

A description will now be given, with reference to a time chart of FIG. 9, of an operation of the optical amplifier according to the first embodiment. In the figure, (1) indicates a state which precedes an interruption of the input signal light; (2) indicates a state of interruption of the input signal light; (3) indicates a transit, or transition, stage state in which the strength or intensity of the signal light input to the optical amplifying medium EDF is increased; and (4) indicates a stable state subsequent to the above-mentioned transit, or transition, stage. The input signal light Pi is interrupted at a time t1 and returns at a time t2. When the input signal light Pi is interrupted at the time t1, the interruption of the input signal light is detected by the above-mentioned input signal light interruption detecting circuit. Thereby, the output of the comparator COMP becomes a minus signal which drives the timer 4. The timer 4 is always in a waiting state. When the timer 4 receives the minus signal from the comparator, the timer 4 increases the degree of attenuation of the variable attenuator element ATT without a time delay. The increased degree is maintained for a period during which the input signal light Pi is interrupted. Thereafter, when the input signal light Pi returns, a plus signal (return signal) is supplied to the timer 4. When the timer 4 receives the return signal, the timer 4 controls the variable attenuator element ATT to decrease the degree of attenuation thereof at a predetermined rate. It is preferable to use a maximum rate corresponding to a point (xth) shown in FIG. 16 at which no optical surge is generated.

Figure 16:
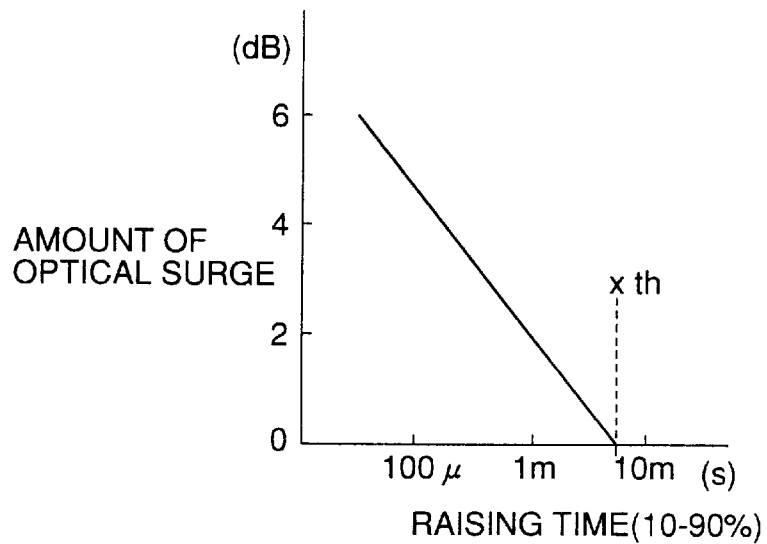
FIG. 16 is a graph showing a relationship between a raising speed (time) of the input signal light and an amount of an optical surge.

FIG. 16 shows a relationship between an amount of optical surge and a raising time needed for increasing the input signal light when the input signal light returns to the original level. It is appreciated that the amount of optical surge depends on the raising time. That is, if a rate of increase is high, the amount of optical surge is large, and if the rate of increase is low, the amount of surge is small. The maximum rate of increase in the optical signal light is obtained at the point (xth).

Accordingly, the variable attenuator element ATT decreases the rate of decrease in the degree of attenuation so that a value piEDF of the input signal light at an input end of the optical amplifying medium EDF is increased at the maximum rate corresponding to the point (xth) at which no optical surge is generated. As a result, the output signal light Po is increased as shown in FIG. 9 in which no optical surge is generated.

It should be noted that one of a known electroabsorption modulator, a known acousto-optic modulator or a known magnetooptical attenuator can be used as the variable attenuator element ATT. The acousto-optic modulator is commercially available as "HOYA-SCHOTT". The magnetooptical attenuator is also available as suggested at Electronic Society conference of IEICE, C-127, 128 (1996.6).

The electroabsorption (EA) modulator is also suggested, for example, in the Technical Report of IEICE OPE96-118 (1996, 12).

When the variable attenuator element ATT is positioned structurally preceding the optical amplifying medium, a decrease in the output power can be prevented, that is, an amount of power or intensity of the pumping light to be increased can be eliminated.

Figure 17:
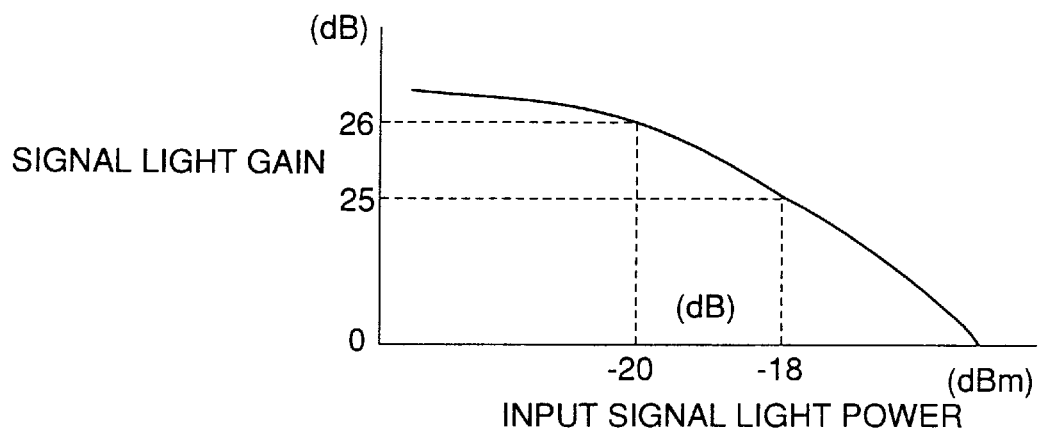
FIG. 17 is a graph showing a relationship between a power of the input signal light and a signal gain in the optical amplifying medium EDF.

FIG. 17 shows an example of a relationship between a gain and an input power of the input signal light entering the optical amplifier medium EDF. In the relationship shown in FIG. 17, the following result is obtained.

In a case in which a loss (2 dB) is present after the optical amplifying medium, the power of the output signal light is calculated as Po=−18+25−2=+5 dBm.

In a case in which a loss (2 dB) is positioned structurally preceding the optical amplifying medium, the power of the output signal light is calculated as Po=−18−2+26=+6 dBm.

A description will now be given, with reference to FIGS. 8 and 10, of an optical amplifier according to a second embodiment of the present invention. The structure of the optical amplifier according to the second embodiment is the same as the optical amplifier according to the first embodiment. Additionally, an operation of the second embodiment is basically the same as that of the first embodiment except for the operation of the variable attenuator element ATT which is controlled by an output of the timer 4. That is, the variable attenuator element ATT of the second embodiment does not increase the degree of attenuation immediately after reception of a signal indicating an interruption of the input signal light, but starts to increase the degree of attenuation at a time t3 when the optical surge ungenerated time area A is ended, after the degree of attenuation is maintained at a small value during the optical surge ungenerated time area A.

A description will now be given, with reference to FIG. 8, of the above-mentioned control operation for the variable attenuator element ATT. A part of the input signal light Pi is always split by the beam splitter BS1, and is detected by the photo diode PD1. A signal output from the photo diode PD1 is compared with the reference voltage Vref. When the input signal light Pi is interrupted and is not present, the output level of the photo diode PD1 is decreased. As a result, the output of the comparator COMP is changed to a minus signal which indicates a detection of the interruption of the input signal light. In the present embodiment, the timer 4 does not control the variable attenuator element ATT immediately after the minus signal is received from the comparator COMP. The timer 4 counts a time so as to control the variable attenuator element ATT after a predetermined time has elapsed, that is, at a time when the optical surge ungenerated time area A is ended. When the interruption of the input signal light Pi continues beyond the optical surge ungenerated time area A, the timer controls the variable attenuator element ATT so as to increase the degree of attenuation after the optical surge ungenerated time area A is ended. However, when the input signal light Pi returns within the optical surge ungenerated time area A, the timer 4 does not control the variable attenuator element ATT and returns to the waiting state.

Figure 10:
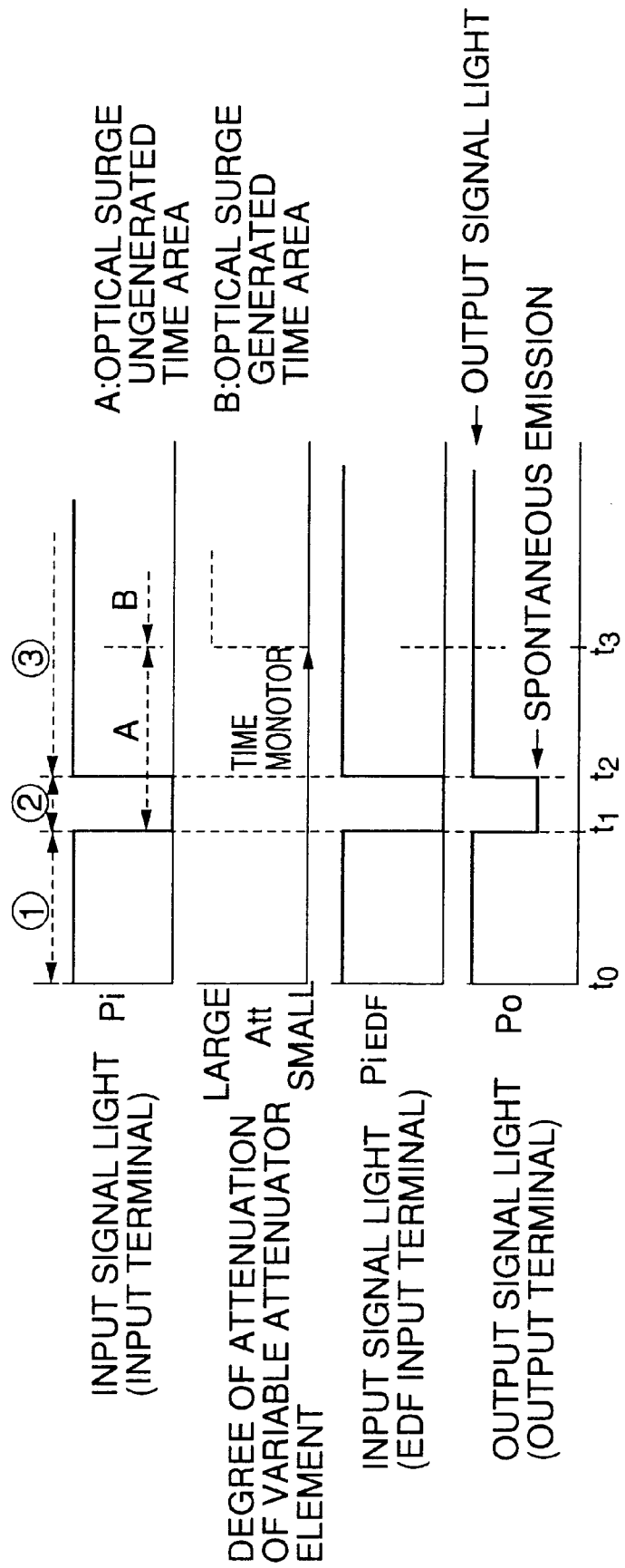
FIG. 10 is a time chart for explaining an operation of an optical amplifier according to a second embodiment of the present invention.

FIG. 10 shows an example in which the input signal light Pi is interrupted at the time t1 and returns at the time t2 within the optical surge ungenerated time area A. In FIG. 10, (1) indicates a state before the input signal light Pi is interrupted; (2) indicates a state where the input signal light Pi is interrupted; (3) indicates a state where the input signal light Pi returns. In this example, since the input signal light Pi returns within the optical surge ungenerated time area A, an optical surge is not generated in the output signal light Po as shown in FIG. 10. The present embodiment differs from the first embodiment in that the degree of attenuation of the variable attenuator element ATT can be maintained at a minimum value during the optical surge ungenerated time area A even when the input signal light Pi is interrupted. That is, the timer 4 receives the signal indicating the interruption of the input signal light Pi, but the variable attenuator element ATT is not controlled by the timer 4 and the operation is ended. As a result, when the input signal light Pi returns during the optical surge ungenerated time area A, a high-speed increase in the signal light can be achieved in response to the increase in the input signal light Pi.

A description will now be given of a case in which the input signal light Pi returns at a time beyond the optical surge ungenerated time area A. The variable attenuator element ATT is controlled by the timer 4 at the time t3 which is the end time of the optical surge ungenerated time area A so that the degree of attenuation thereof is increased. That is, the timer 4 controls the variable attenuator element ATT when the interruption of the input signal light Pi continues beyond the optical surge ungenerated time area A so as to increase the degree of attenuation at the end time of the optical surge ungenerated time area A so that an optical surge is prevented from being generated during the optical surge generated period. Additionally, although FIG. 10 does not show a case in which the input signal light Pi returns, a control the same as that shown by (3) of FIG. 9 can also be performed in the present embodiment. That is, the degree of attenuation starts to be decreased at a certain rate of decrease at the time of return of the input signal light Pi so that an optical surge is not generated.

Figure 11:
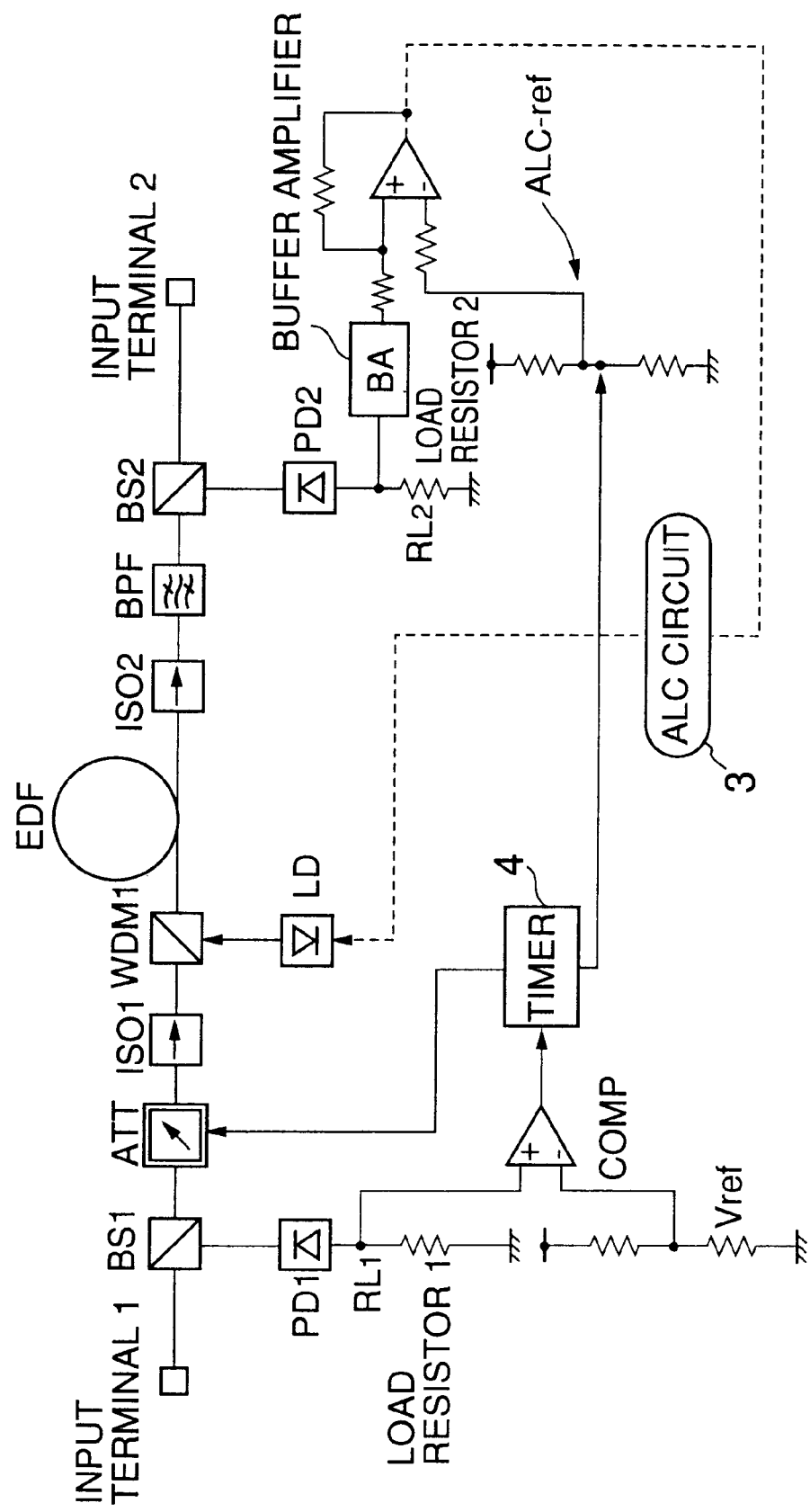
FIG. 11 is a system diagram of an optical amplifier according to a third embodiment of the present invention.

A third embodiment of the present invention is shown in FIG. 11. An optical amplifier shown in FIG. 11 has the same structure as that shown in FIG. 8 except for a pumping light stopping means, or unit being added, the pumping light stopping means being controlled by the output of the comparator COMP.

Figure 5:
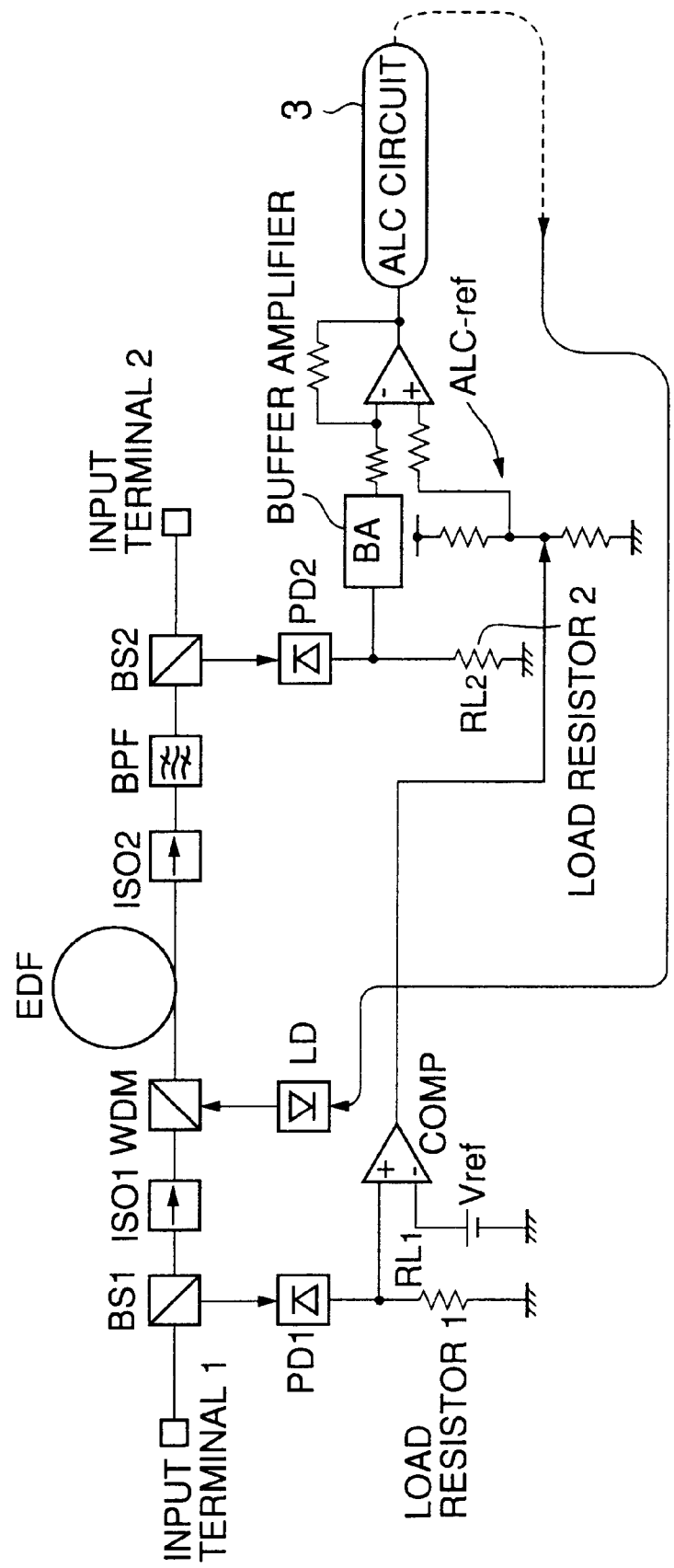
FIG. 5 is a system diagram of an example of a conventional optical amplifier.
Figure 6:
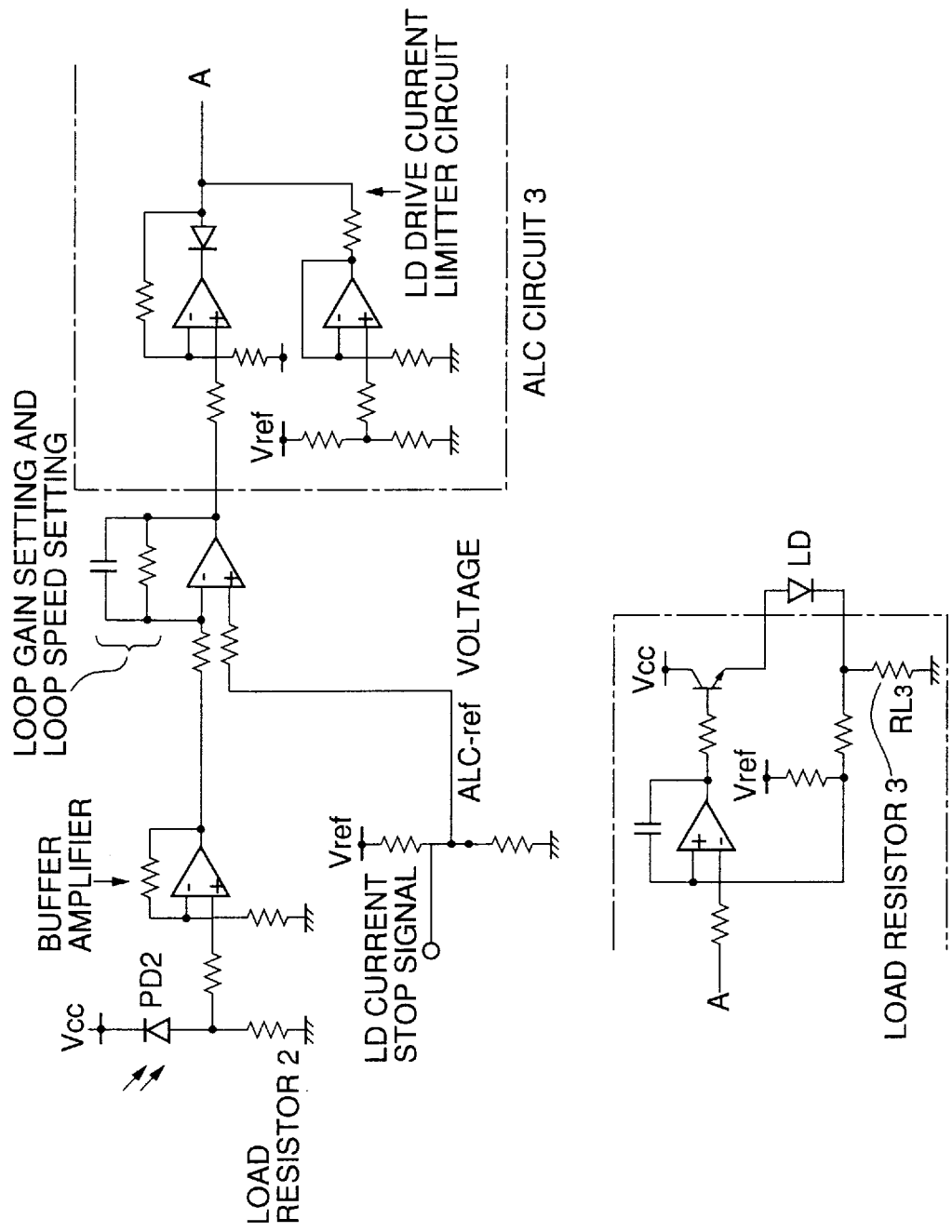
FIG. 6 is a circuit diagram of an ALC circuit shown in FIG. 5.
Figure 7:
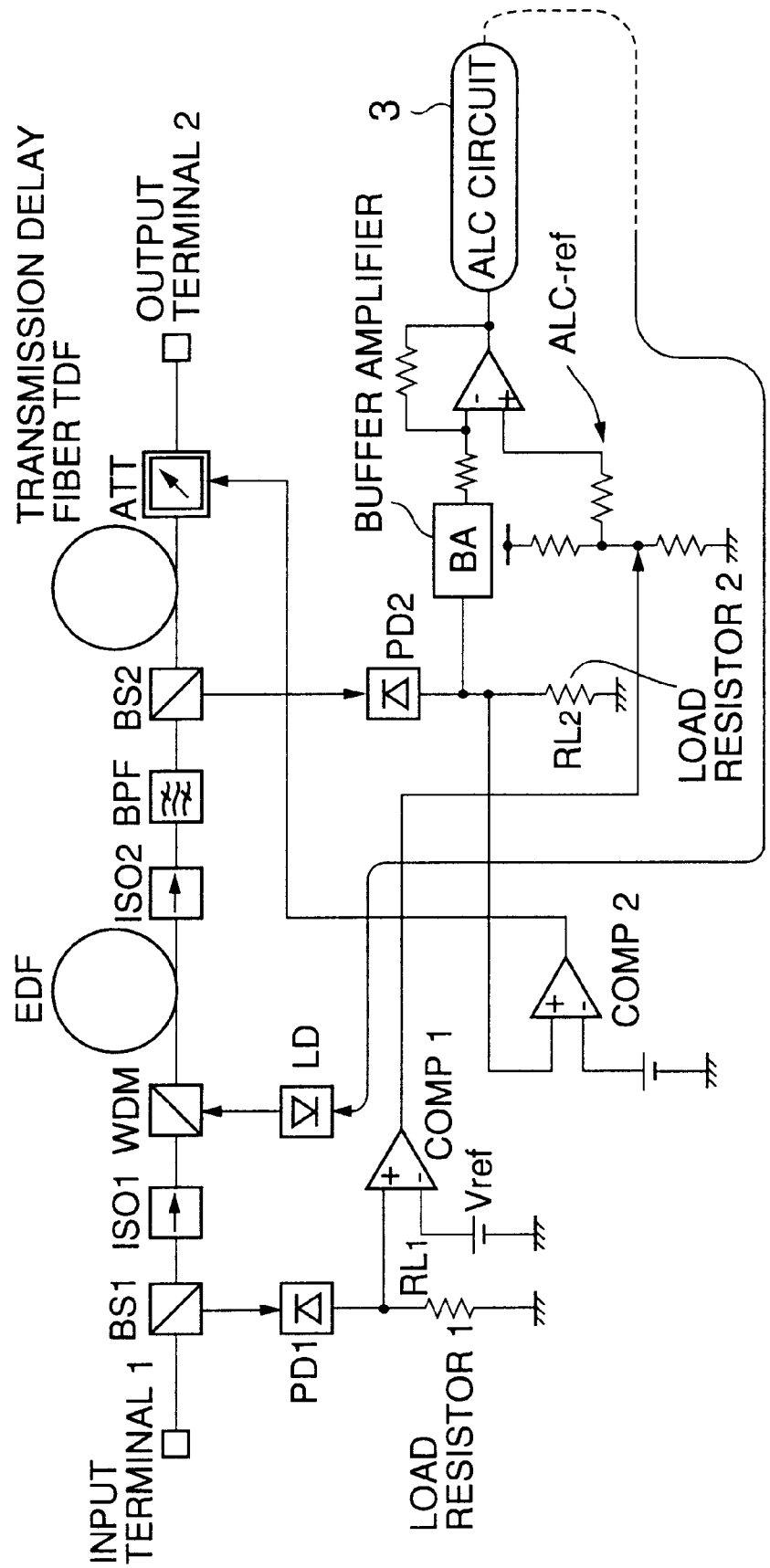
FIG. 7 is a system diagram of an example of a system which improves the system shown in FIG. 5.

An input signal light Pi is input to an input terminal 1, and is amplified by a beam splitter BS1, an attenuator ATT, an optical isolator ISO1, a wave length division multiplexer WDM, an optical amplifying medium EDF, an optical isolator ISO2 and an optical band pass filter BPF so that an amplified output light signal Po is output from an output terminal 2. The input signal light Pi is synthesized with an output (pumping light) of a laser diode LD by the wave length division multiplexer WDM, and then input to the optical amplifying medium EDF. A part of the input signal light Pi is continuously split by the beam splitter BS1 and the split light is detected by a photo diode PD1. An output of the photo diode PD1 is compared with a reference voltage Vref by a comparator COMP so as to determine a presence of the detected light. When the input signal light Pi is present, a plus signal is output from the comparator COMP. When the input signal Pi is not present, a minus signal is output from the comparator COMP. The output of the comparator COMP is supplied to a timer 4 and an automatic level control (ALC) circuit 3. The timer 4 is always in a waiting state. The timer 4 controls the degree of attenuation by the variable attenuator element ATT when an interruption of the input signal light Pi is detected, that is, when the output of the comparator COMP is a minus signal. A control may be performed without a time delay when an interruption is detected, or may be performed when a predetermined period has elapsed after the detection of the interruption. The output of the comparator supplied to the ALC circuit 3 is compared with the output signal which is split by a beam splitter BS2 so as to control the laser diode LD to stop the pumping light. An example of a structure of the ALC circuit 3 is shown in FIG. 5.

Figure 3:
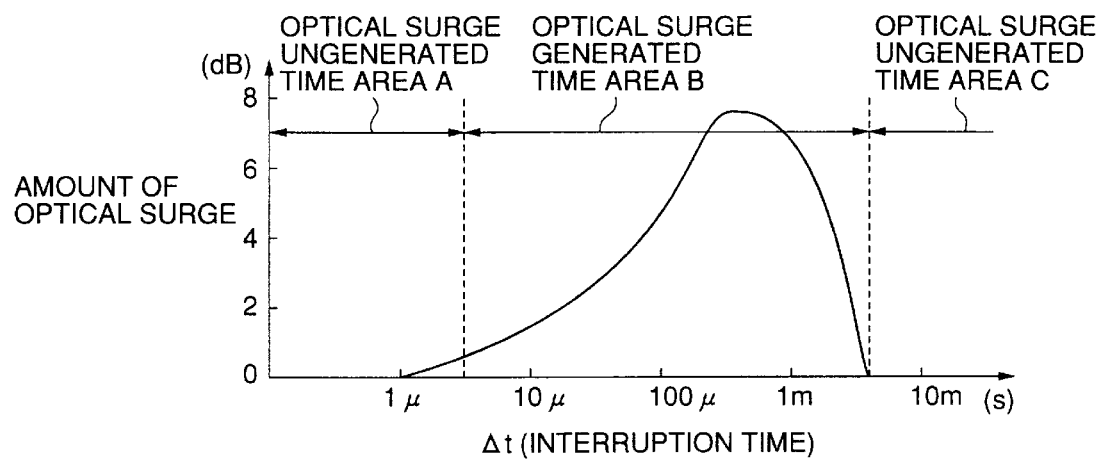
FIG. 3 is a graph showing a relationship between an interruption of an input signal light and an optical surge (when an input interruption function of a pumping light is provided)
Figure 4:
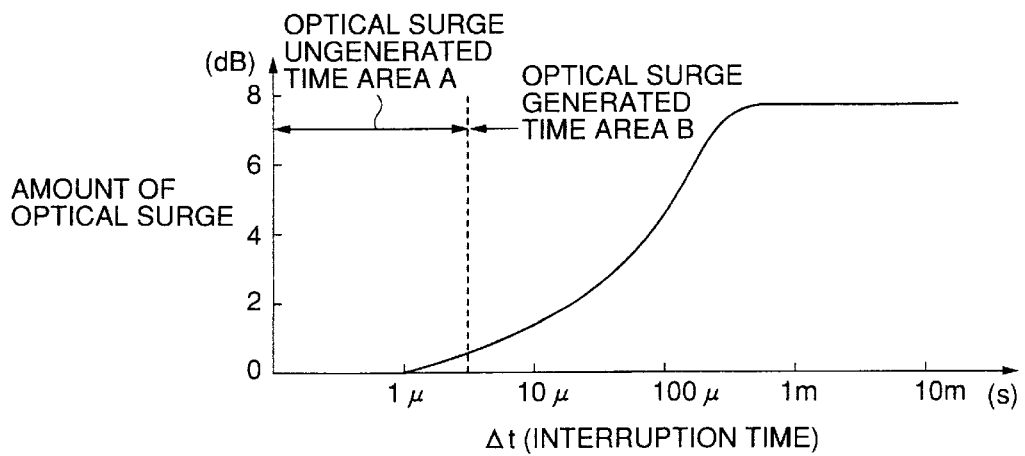
FIG. 4 is a graph showing a relationship between an interruption of the input signal light and an optical surge (when the input interruption function of the pumping light is not provided)

The present embodiment is related to a control of the degree of attenuation of the variable attenuator element provided on the signal input side of the optical amplifying medium EDF of the optical amplifier having a pumping light stopping means. The optical amplifier having a pumping light stopping means does not generate an optical surge when the input signal light Pi returns during the optical surge ungenerated time area C as shown in FIG. 3. Accordingly, it is meaningless to decrease the degree of attenuation of the variable attenuator element ATT during the optical surge ungenerated time area C.

Accordingly, in the third embodiment, the variable attenuator element ATT is controlled by the output of the timer 4 so that the degree of attenuation of the variable attenuator element ATT is increased from a time when the input signal light is interrupted, and is decreased at a time when an optical surge is not generated after a period, during which the optical surge is generated, is ended. That is, the timer 4 increases the degree of attenuation of the variable attenuator element ATT after the signal indicating the interruption of the input signal light Pi is received from the comparator COMP at the time t1, and, simultaneously, the timer 4 starts a timing operation to measure a time so as to decrease the degree of attenuation of the variable attenuator element ATT at the time t3 after the optical surge generated time area B has elapsed, that is, at the start time of the optical surge ungenerated time area C.

A description will now be given of a fourth embodiment of the present invention. The structure of the fourth embodiment is the same as that of the third embodiment. In the fourth embodiment, the degree of attenuation of the variable attenuator element is increased at a time when an optical surge is generated after a predetermine period has passed after the interruption of the input signal light Pi. Thereafter, the variable attenuator element ATT is controlled by the output of the timer 4 so that the degree of attenuation is decreased at a time when an optical surge is not generated. That is, the timer 4 starts a timing operation at the time t1 when the signal indicating the interruption of the input signal light Pi is received from the comparator COMP. Then, the timer 4 starts to increase the degree of attenuation of the variable attenuator element ATT at the same time the optical surge generated area B is started, that is, when the optical surge ungenerated time area A is ended. The timer 4 controls the variable attenuator element to maintain the degree of attenuation until a time when an optical surge is not generated. Thereafter, the timer 4 controls the variable attenuator element ATT so as to decrease the degree of attenuation at the time t3 which is an end time of the optical surge generated time area B, that is, at the start time of the optical surge ungenerated time area C. The third embodiment provides a simplified control, whereas the fourth embodiment can maintain the degree of attenuation at a minimum value during the optical surge ungenerated time area A and the optical surge ungenerated time area C. Additionally, the fourth embodiment can input the signal light at a rate of increase of the returned input signal light without being influenced by the degree of attenuation of the variable attenuator element ATT when the input signal light Pi returns during the optical surge ungenerated time area A and the optical surge ungenerated time area C. Thus, a time delay of an increase in the output signal light Po can be prevented.

A description will now be given of fifth and sixth embodiments of the present invention. The fifth and sixth embodiments are related to a control of a pumping light stopping period of a pumping light stopping means, or unit,. Since the optical surge is generated due to the media which is excited by the pumping light during a period of interruption of the input signal light Pi, the pumping light is stopped at least a period during which the input signal light Pi is interrupted.

In the fifth embodiment, as mentioned above, the pumping light is stopped during the period when the input signal light Pi is interrupted. That is, in the fifth embodiment, the timer 4 is always in a waiting state. The timer 4 stops the oscillation of the laser diode LD by controlling the laser diode LD via the ALC circuit 3 immediately after the signal indicating the interruption of the input signal light Pi is received from the comparator COMP at the time t1 so as to stop the input of the pumping light to the optical amplifying medium EDF. The stoppage of the pumping light is continued for the period during which the input signal light Pi is interrupted. When the input signal light Pi returns at the time t4, the return signal is supplied to the timer 4 from the comparator COMP. Upon receipt of the return signal, the timer 4 starts the oscillation of the laser diode LD via the ALC circuit 3.

Since the period corresponding to the optical surge ungenerated time area A is so short that the rare earth doped optical fiber which is the optical amplifying medium cannot respond, there is no problem even if the pumping light is present during that time. Accordingly, in the sixth embodiment, the pumping light is stopped for the period from a time when an optical surge starts to be generated after a predetermined period has elapsed from the interruption of the input signal light Pi and until the input signal light Pi returns. That is, a timing operation of the timer 4 is started at the time t1 when the signal indicating the interruption of the input signal light Pi is received from the comparator COMP. Then, the oscillation of the laser diode LD is stopped via the ALC circuit 3 at the time t2 when the optical surge generated time area B is started, that is, when the optical surge ungenerated time area A is ended so that the input of the pumping light to the optical amplifying medium EDF is stopped. Then, the stoppage of the pumping light is continued for the period during which the input signal light Pi is interrupted. When the input signal light Pi returns at the time t4, the return signal is supplied to the timer 4. Upon receipt of the return signal, the timer 4 controls the laser diode LD via the ALC circuit 3 so as to start an oscillation of the laser diode LD. The fifth embodiment provides a simplified control, whereas the sixth embodiment does not require stopping of the pumping light during the optical surge generated time area A. Additionally, the sixth embodiment can reduce a time needed for restarting the input of the pumping light when the input signal light returns during the optical surge generated time area A. Thus, a time delay of an increase in the output signal light Po can be prevented.

A description will now be given of a seventh embodiment and an eighth embodiment of the present invention. The seventh embodiment and the eighth embodiment of the present invention are related to a determination of the start time of the optical surge ungenerated time area C.

Figure 1:
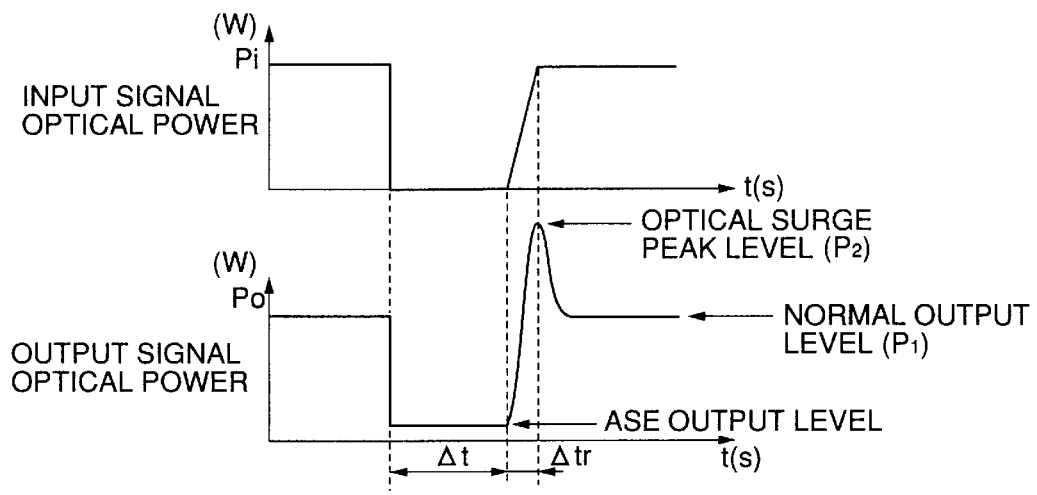
FIG. 1 is an illustration for explaining a definition of an optical surge related to the present invention.
Figure 2:
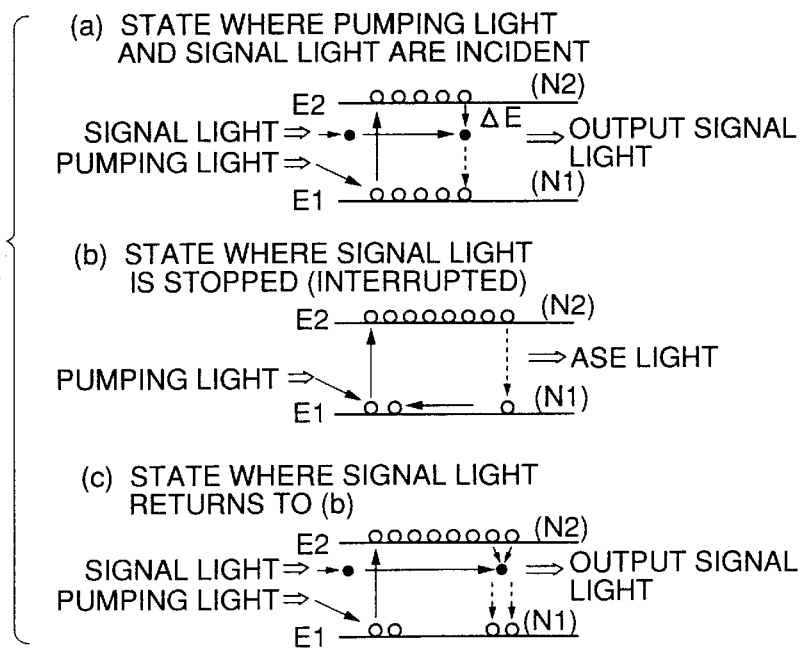
FIG. 2 is an illustration for explaining a concept of generation of the optical surge.
Figure 12:
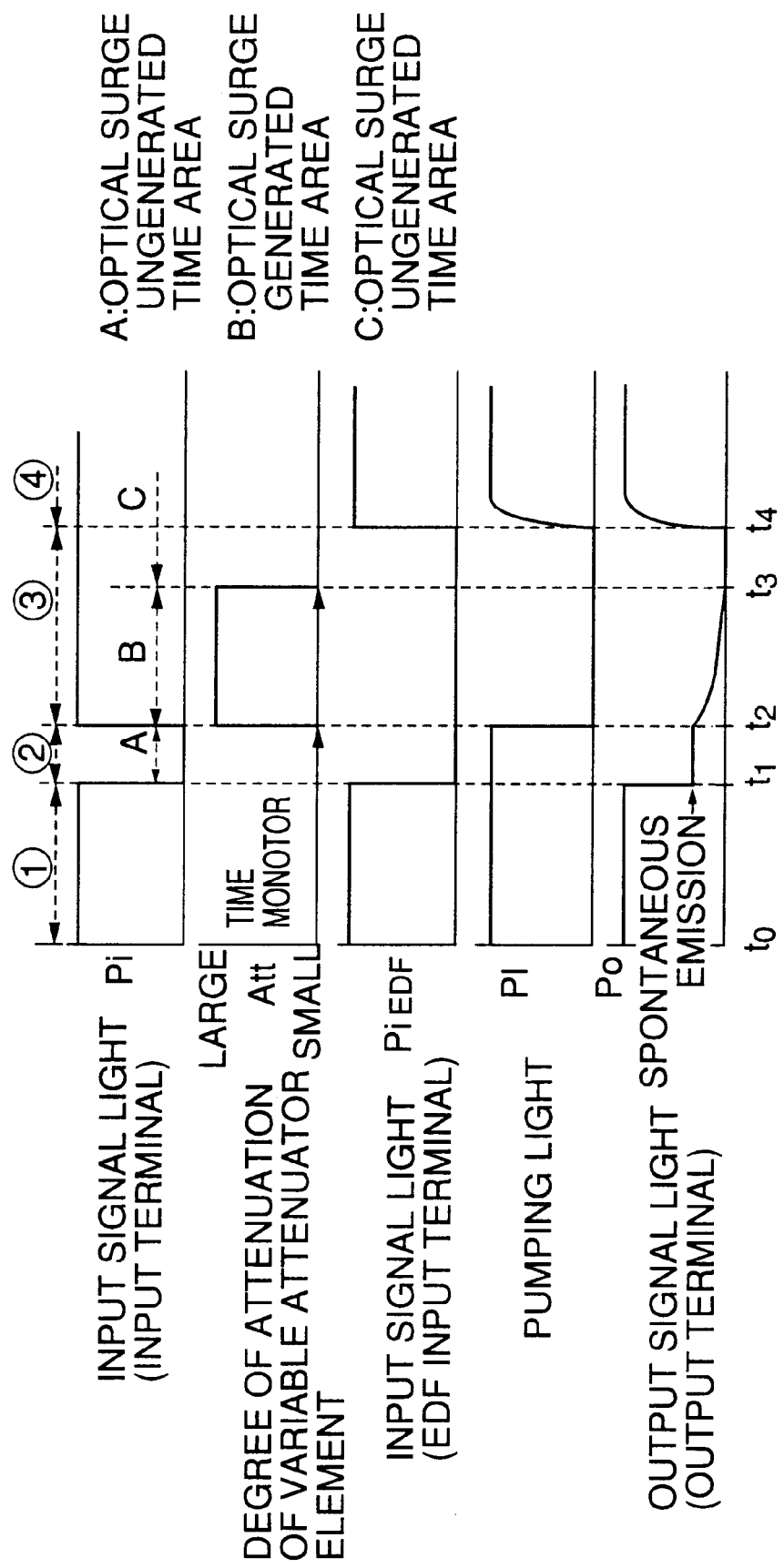
FIG. 12 is a time chart for explaining an operation of the optical amplifier shown in FIG. 11.

In the seventh embodiment, the start time of the optical surge ungenerated time area C is set to a time when all excited carriers shown in FIG. 2-(2) lower their levels by spontaneous emission and no excited carrier that can emit a light remains. The time needed for all carriers going down to the ground level is equal to the life time of the excited carries in the rare earth doped optical fiber. Thus, the timer 4 is set by predicting the time t3 of FIG. 12 based on an average life time of excited carriers in the rare earth doped optical fiber.

In the eighth embodiment of the present embodiment, as shown in a graph of the output signal light Po, since the input signal light Pi and the pumping light are not input to the optical amplifying medium EDF during the optical surge generated time area B, the power of the output signal light Po is gradually decreased when the excited carriers go down to the ground level by spontaneous emission. Then, the output signal light Po no longer exists at the time t3 when almost all the excited carriers have fallen to the ground level. Accordingly, by monitoring the power level of the spontaneous emission, the time when the optical surge is not generated any more can be determined.

Figure 15:
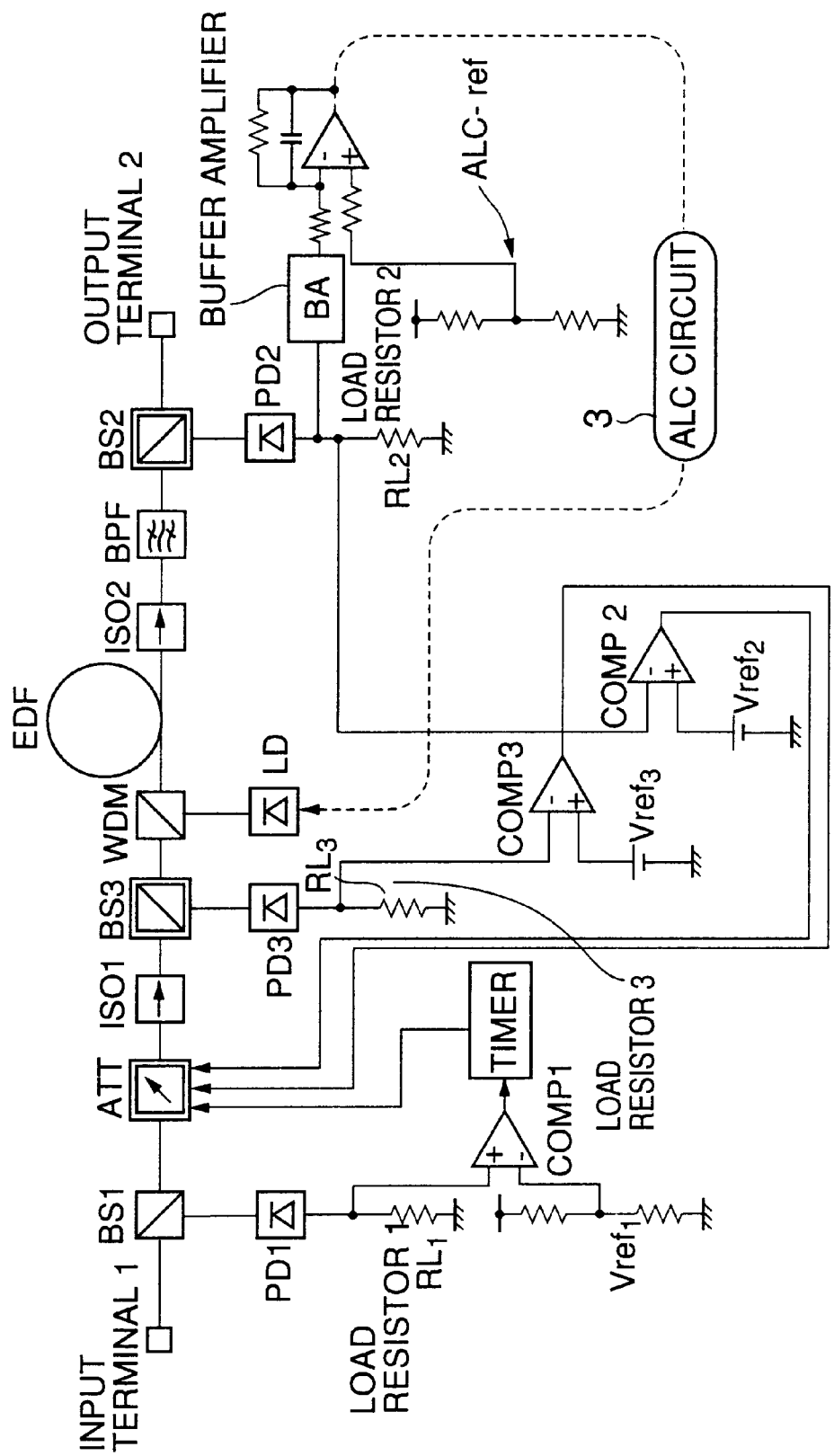
FIG. 15 is a system diagram of an optical amplifier in which a determination of passage of an optical surge generated time is made by using a photo diode on the input side or output side of an optical amplifying medium EDF.

In the eighth embodiment of the present invention, as shown in FIG. 15, the level of a spontaneous emission in the optical amplifying medium EDF is monitored on the input side or the output side so that the variable attenuator element ATT is controlled by the output spontaneous emission. The output signal light Po is always split by a beam splitter BS2, and the output of the BS2 is detected by a photo diode PD2. A detection signal of the photo diode PD2 is compared with a reference voltage Vref2 so that a level of the spontaneous emission is checked. If the level of the spontaneous emission is large, a plus signal is output from the comparator COMP. If the level of the spontaneous emission is small, a minus signal is output from the comparator COMP. The variable attenuator element ATT changes the degree of attenuation based on the output of the comparator COMP. A level of the spontaneous emission on the input side of the optical amplifying medium EDF can be monitored in the same manner by a beam splitter BS3, a photo diode PD3 and a comparator COMP3. If the AES level of the spontaneous emission is monitored by the photo diode PD2, the beam splitter BS3, the photo diode PD3 and the comparator COMP3 are not necessary. If the AES level of the spontaneous emission is monitored by the photo diode PD3, the comparator COMP2 is not necessary. According to the present embodiment, an increase in the size of the circuit and complication of an assembly operation due to an increase in the number of parts can be prevented.

Additionally, the structure shown in FIG. 11 can also prevent an increase in the size of the circuit and complication of an assembly operation.

That is, the optical circuit can be constructed by merely adding a variable attenuator element to a regular optical amplifier, and the control circuit can be constructed by merely adding the control means for the variable attenuator element and the monitoring means for an interruption of the input signal light. Thus, the number of parts is not extremely increased.

Additionally, in the structure shown in FIG. 15, the optical circuit can be constructed by merely adding to the regular optical amplifier a variable attenuator element and a beam splitter and a photo diode on the input side or output side of the EDF. The control circuit can be constructed by merely adding to the regular optical amplifier the control means for the variable attenuator element and the monitoring means for a level of a spontaneous emission and a comparator. Thus, the number of parts is not extremely increased.

Figure 13:
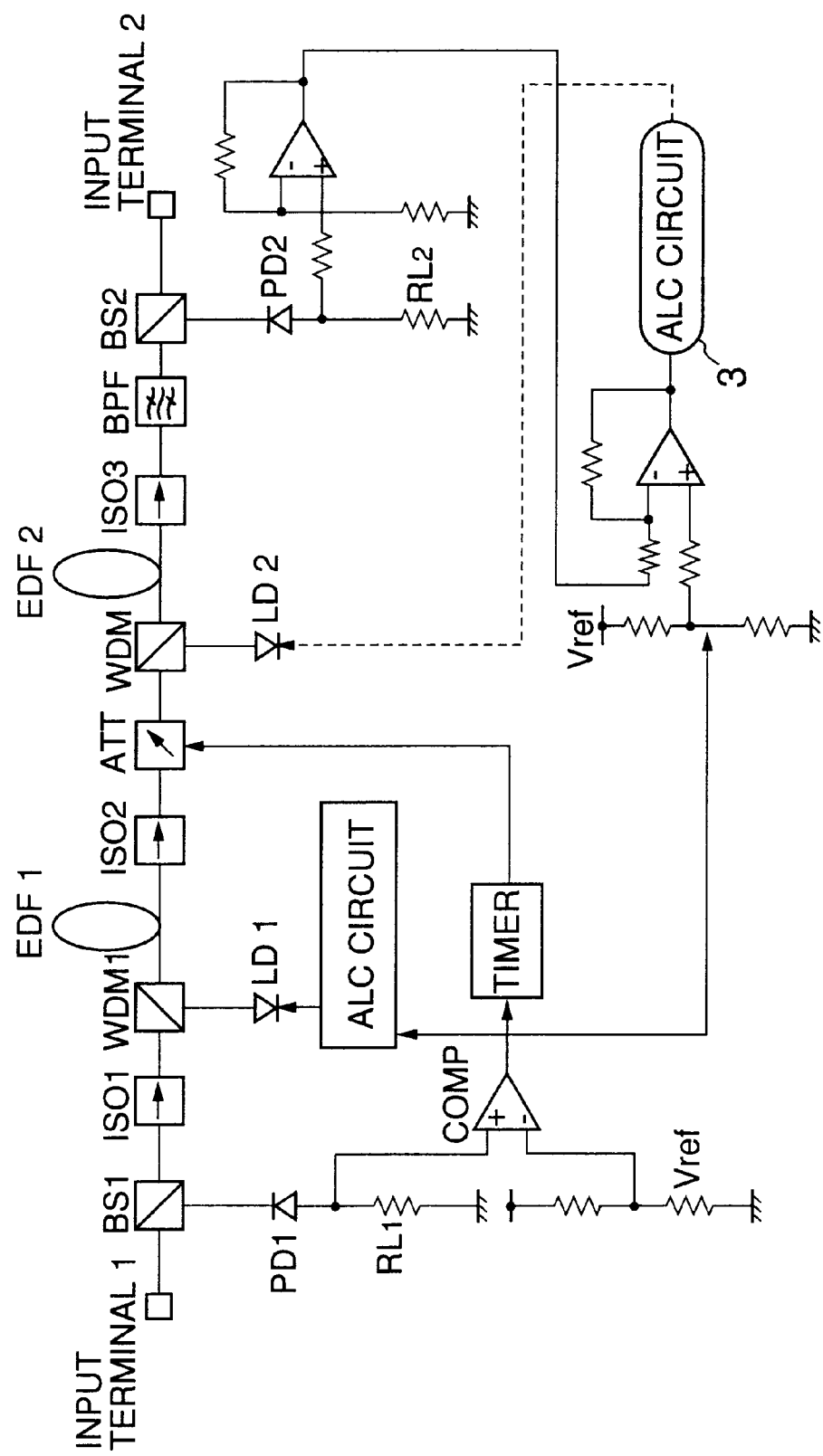
FIG. 13 is a system diagram of an optical amplifier in which a plurality of optical amplifying media is provided.
Figure 14:
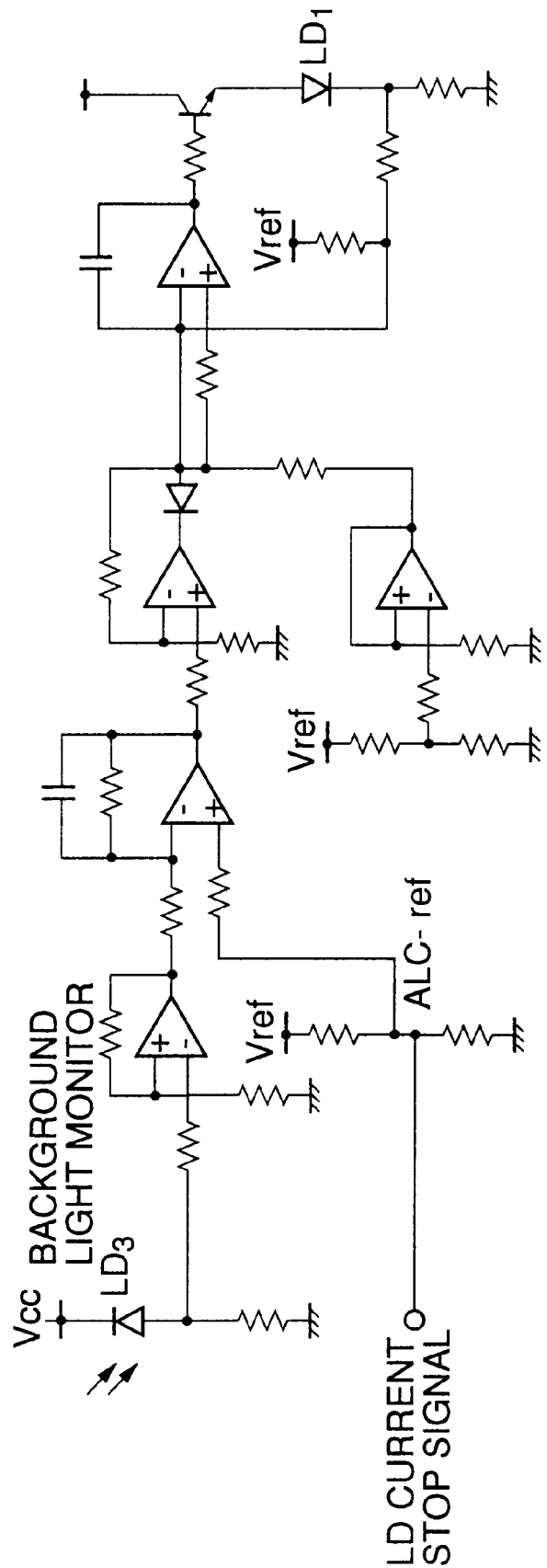
FIG. 14 is a circuit diagram of an APC circuit shown in FIG. 13.

FIG. 13 shows a circuit in which a plurality of optical amplifying media EDF are provided. An APC circuit, which is controlled by a signal indicating an interruption of the input signal light Pi, is connected to a laser diode LD1 provided to a first stage optical amplifying medium EDF1. An example of the APC circuit is shown in FIG. 14. In the optical amplifier shown in FIG. 13, the variable attenuator element ATT is positioned between the first stage optical amplifying medium EDF1 and a second stage optical amplifying medium EDF2 so that the variable attenuator element ATT is controlled by the timer 4 to which the output of the input signal light interruption detecting circuit is supplied. The ALC circuit 3, which is controlled by the signal indicating an interruption of the input signal light Pi, is connected to the laser diode LD2 provided to the second stage optical amplifying medium EDF2 so that an operation of the laser diode LD2 is stopped when the input signal light Pi is interrupted.

It is predicted that a demand for a method of use in which an input signal light to an optical amplifier fluctuates due to use of an optical switch on a transmission path will be increased. The present invention is extremely effective for completely eliminating an optical surge in such a method of use.

The present invention is not limited to the specifically disclosed embodiments, and variations and modifications may be made without departing from the scope of the present invention.

What is claimed is:

1. An optical amplifier having an optical amplifying medium to which a synthesized signal of an input signal light and a pumping light is input, said optical amplifier comprising:

an input signal light interruption detecting circuit detecting an interruption of the input signal light and producing a corresponding detection signal output; and a variable attenuator element provided on a signal light input side of said optical amplifying medium and selectively attenuating the input signal light, said variable attenuator element being controlled by the detection signal output of said input signal light interruption detection circuit to increase a degree of attenuation thereof when the input signal light is interrupted and to gradually decrease the degree of attenuation thereof when the input signal light returns.

2. The optical amplifier as claimed in claim 1, wherein said variable attenuator element is a selected one of an electroabsorption optical modulator, an acousto-optical modulator and a magnetooptical attenuator.

3. An optical amplifier having an optical amplifying medium to which a synthesized signal of an input signal light and a pumping light is input, said optical amplifier comprising:

an input signal light interruption detecting circuit detecting an interruption of the input signal light and producing a corresponding detection signal output;

a timer measuring a time after the input signal light is interrupted, upon receipt of the detection signal output of said input signal light interruption detecting circuit; and a variable attenuator element provided on a signal light input side of said optical amplifying medium and selectively attenuating the input signal light, said variable attenuator element being controlled by the timer, in response to the detection signal output of said input signal light interruption detecting circuit, to increase a degree of attenuation thereof when a predetermined time measured by the timer has elapsed after the input signal light is interrupted and to gradually decrease the degree of attenuation thereof when the input signal light returns.

4. The optical amplifier as claimed in claim 3, wherein said variable attenuator element is a selected one of an electroabsorption optical modulator, an acousto-optic modulator and a magnetooptical attenuator.

5. An optical amplifier having an optical amplifying medium to which a synthesized signal of an input signal light and a pumping light is input, said optical amplifier also having a unit selectively stopping the pumping light, said optical amplifier comprising:

an input signal light interruption detecting circuit detecting an interruption of the input signal light and producing a corresponding detection signal output;

a timer measuring a time after the input signal light is interrupted, upon receipt of the corresponding detection signal output of said input signal light interruption detecting circuit, and producing a corresponding timer signal output; and a variable attenuator element provided on a signal light input side of said optical amplifying medium and selectively attenuating the input signal light, said variable attenuator element being controlled by the timer signal output of said timer to increase a degree of attenuation thereof when the input signal light is interrupted and to gradually decrease the degree of attenuation thereof at a time when an optical surge is no longer generated after a period, measured by the timer and during which an optical surge is generated, has passed.

6. The optical amplifier as claimed in claim 5, wherein said unit stopping the pumping light stops the pumping light for a period during which the input signal light is interrupted.

7. The optical amplifier as claimed in claim 5, wherein said unit stops the pumping light for a predetermined period extending from an elapsed time period, when an optical surge is not generated after an interruption of the input signal light, until a time when the input signal light returns.

8. The optical amplifier as claimed in claim 5, wherein the time at which an optical surge is no longer generated is determined, based on a time passage measured by the timer after the input signal light is interrupted.

9. The optical amplifier as claimed in claim 5, wherein the time when an optical surge is no longer generated is determined, based on a level of spontaneous emission in said optical amplifying medium, after the pumping light is stopped.

10. The optical amplifier as claimed in claim 5, wherein said variable attenuator element is a selected one of an electroabsorption optical modulator, an acousto-optic modulator and a magnetooptical attenuator.

11. An optical amplifier having an optical amplifying medium to which a synthesized signal of an input signal light and a pumping light is input, said optical amplifier also having a unit selectively stopping the pumping light, said optical amplifier comprising:

an input signal light interruption detecting circuit detecting an interruption of the input signal light and producing a corresponding detection signal output;

a timer measuring a time after the input signal light is interrupted, upon receipt of the corresponding detection signal output of said input signal light interruption detecting circuit, and producing a corresponding timer signal output; and a variable attenuator element provided on a signal light input side of said optical amplifying medium and selectively attenuating the input signal light, said variable attenuator element being controlled by the timer signal output of said timer so that a degree of attenuation thereof is increased when a predetermined time, measured by the timer, has elapsed after the input signal light is interrupted and the degree of attenuation is decreased at a time, measured by the timer, when the optical surge is no longer generated.

12. The optical amplifier as claimed in claim 11, wherein said unit stops the pumping light for a period during which the input signal light is interrupted.

13. The optical amplifier as claimed in claim 11, wherein said unit stops the pumping light for a predetermined period from an elapsed time period, when an optical surge is not generated after an interruption of the input signal light, until a time when the input signal light returns.

14. The optical amplifier as claimed in claim 11, wherein the time when an optical surge is no longer generated is determined based on a time passage after the input signal light is interrupted.

15. The optical amplifier as claimed in claim 11, wherein the time when an optical surge is no longer generated is determined based on a level of spontaneous emission in said optical amplifying medium after the pumping light is stopped.

16. The optical amplifier as claimed in claim 11, wherein said variable attenuator element is a selected one of an electroabsorption optical modulator, an acousto-optic modulator and a magnetooptical attenuator.

17. An optical amplifier having an input receiving a synthesized signal of an input signal light and a pumping light, comprising:

a detector detecting an interruption of the input signal light and producing a corresponding detection signal output; and a variable attenuator element receiving and selectively attenuating the synthesized signal and supplying the selectively attenuated, synthesized signal to the input of the optical amplifier, the variable attenuator element being responsive to the detection signal output to increase a degree of attenuation thereof when the input signal light is interrupted and to gradually decrease the degree of attenuation thereof when the input signal light returns.

18. An optical amplifier as recited in claim 17, further comprising:

a timer, connected between the input signal light interruption detecting circuit and the variable attenuator element, receiving the detection signal output and, a predetermined period of time thereafter, producing a timer output signal supplied to the variable attenuator element, increasing the degree of attenuation thereof.

19. An optical amplifier as recited in claim 18, wherein if the input signal light returns within the predetermined period of time after the input signal light is interrupted, the timer does not produce a timer output signal and the degree of attenuation of the variable attenuator element is not increased in response to the detection signal output.

20. An optical amplifier as recited in claim 18, wherein the timer measures a time period during which an optical surge is generated and produces a timer output signal decreasing the degree of attenuation of the attenuator at the conclusion of the measured time period, following which an optical surge is no longer generated.

21. An optical amplifier as recited in claim 18, wherein the variable attenuator element is controlled by the timer output signal so that a degree of attenuation thereof is increased when a first predetermined time, measured by the timer, has elapsed after the input signal is interrupted and the degree of attenuation is decreased at a subsequent predetermined time, measured by the timer, when the optical surge is no longer generated.

* * * * *

UNITED STATES PATENT AND TRADEMARK OFFICE
CERTIFICATE OF CORRECTION

PATENT NO.: 5,986,799
DATED : November 16, 1999
INVENTOR(S): Hiroyuki ITOU et al.

It is certified that error appears in the above-identified patent and that said Letters Patent is hereby corrected as shown below:

On the title page, [56] References Cited, second U.S. Reference, change "Lemsa" to --Lemson--.

On the title page, [57] Abstract, line 8, change "so as to" to -- and selectively--
lines 11-12, change "of the variable attenuator element" to --thereof--;

line 13, after "attentuation" insert --thereof--.

Signed and Sealed this

Twenty-third Day of May, 2000

*Attest:*

Q. TODD DICKINSON

*Attesting Officer*     *Director of Patents and Trademarks*